No. 828,059. PATENTED AUG. 7, 1906.
W. A. SCHRAUBSTADTER.
TYPE CASTING MACHINE.
APPLICATION FILED APR. 24, 1903.

9 SHEETS—SHEET 1.

Attest:
Edw. L. Dillon
Julia B. McGann

Inventor:
W. A. Schraubstadter
by Carr & Carr,
Att'ys.

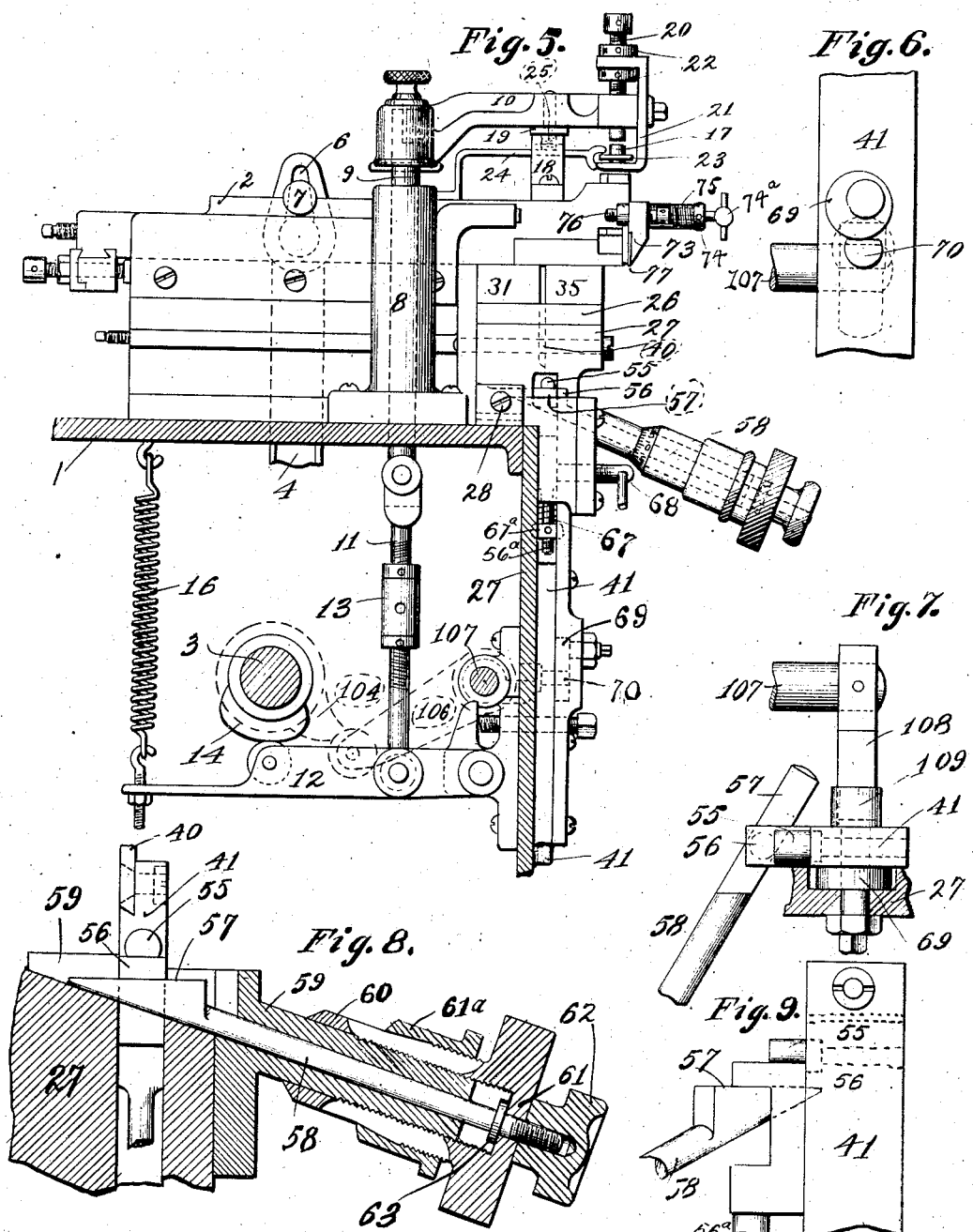

No. 828,059. PATENTED AUG. 7, 1906.
W. A. SCHRAUBSTADTER.
TYPE CASTING MACHINE.
APPLICATION FILED APR. 24, 1903.

9 SHEETS—SHEET 3.

Witnesses:
G. W. Pennington
J. B. Megowi

Inventor:
W. A. Schraubstadter
By Cannt Cann
Attys.

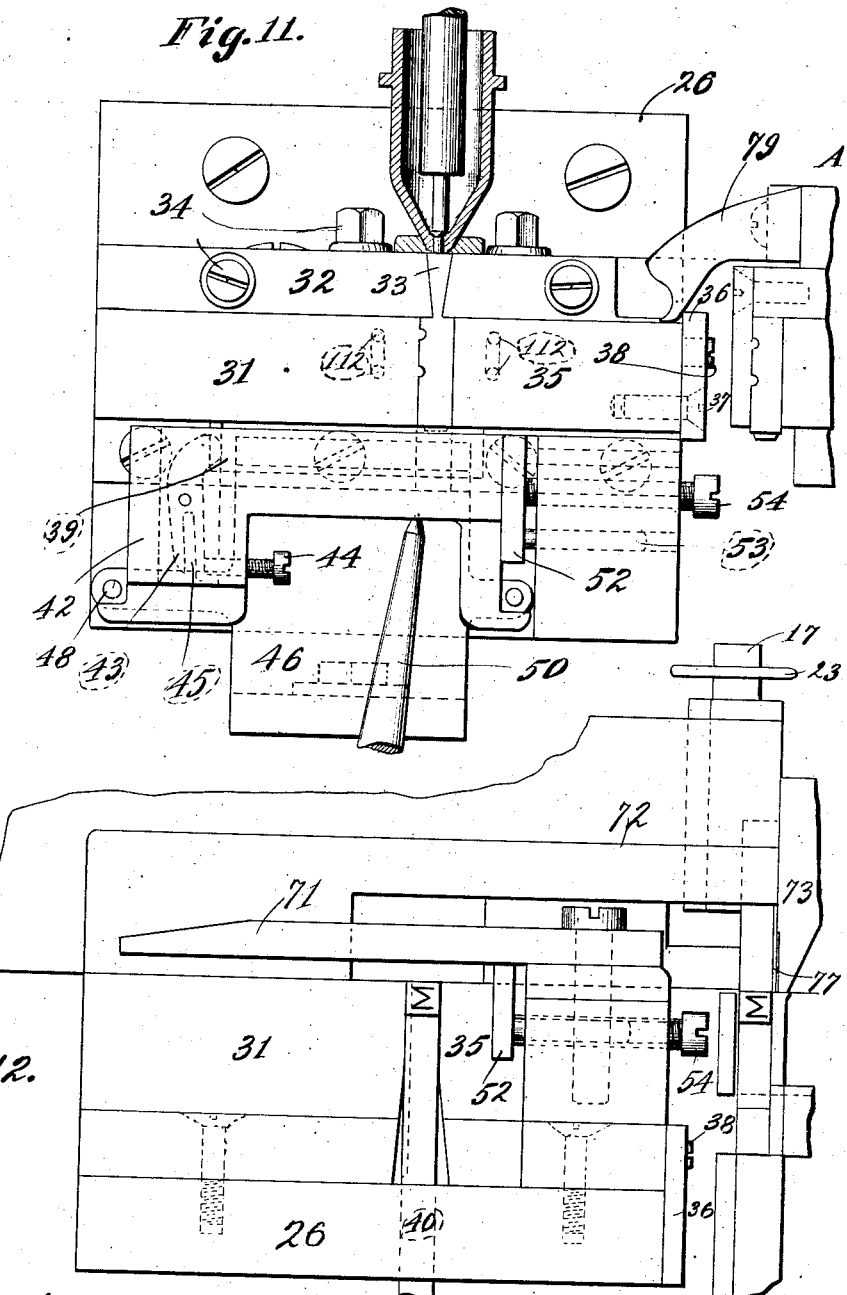

No. 828,059. PATENTED AUG. 7, 1906.
W. A. SCHRAUBSTADTER.
TYPE CASTING MACHINE.
APPLICATION FILED APR. 24, 1903.
9 SHEETS—SHEET 5.
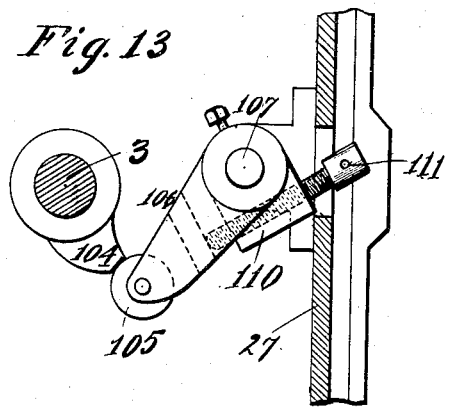
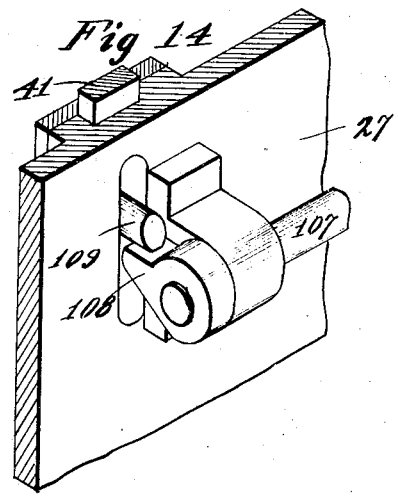
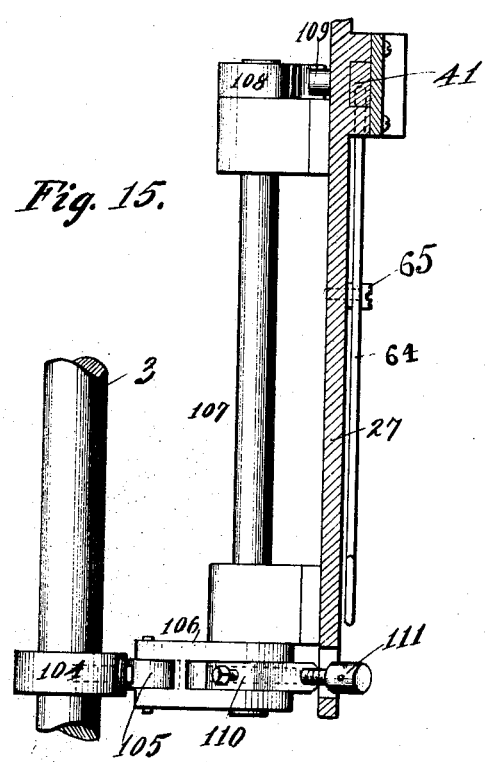
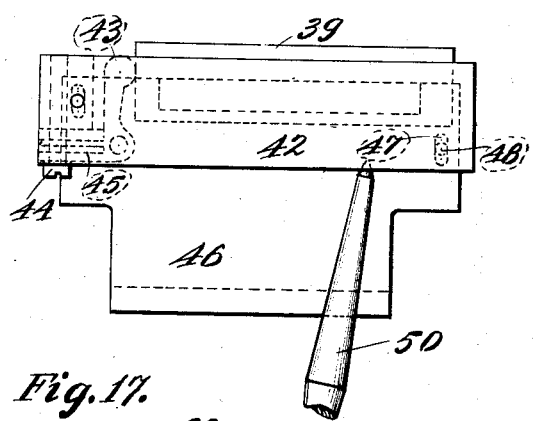
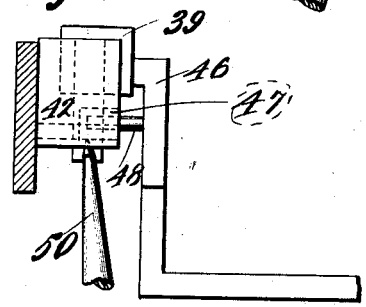
Attest:
Edw. L. Dillon
J. B. Megown
Inventor:
W. A. Schraubstadter,
by Cann & Cann
Att'ys.

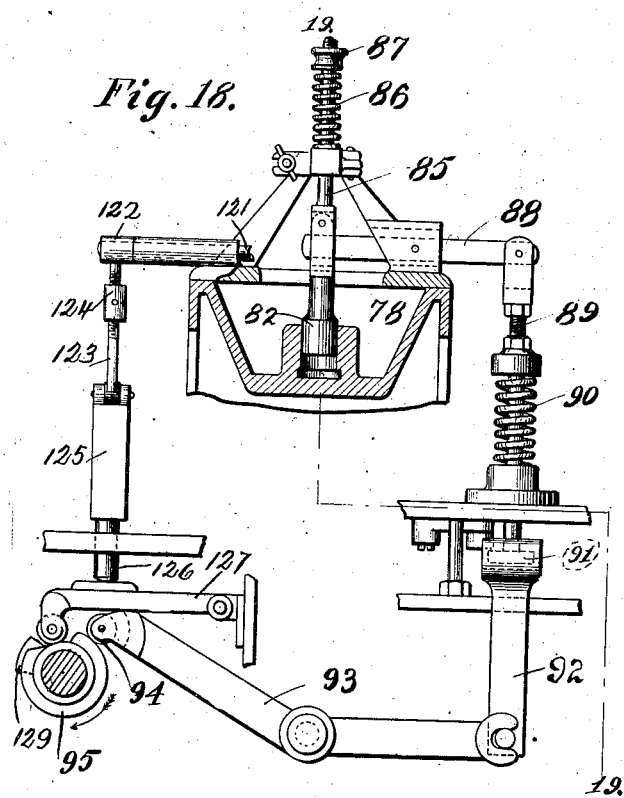
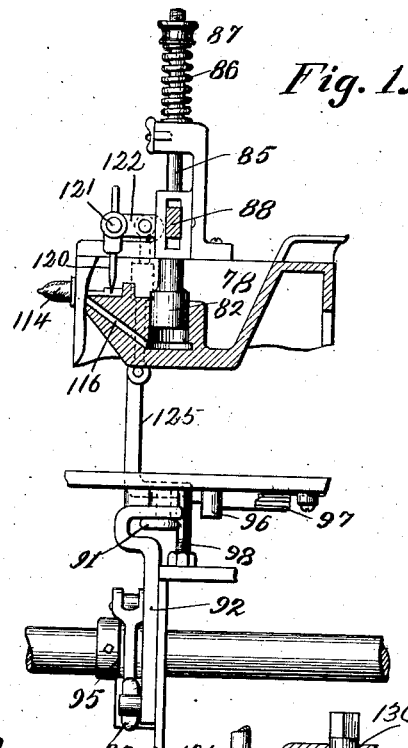
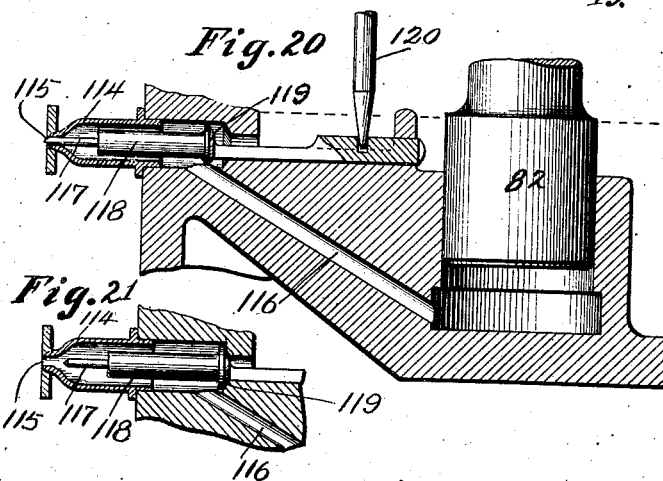
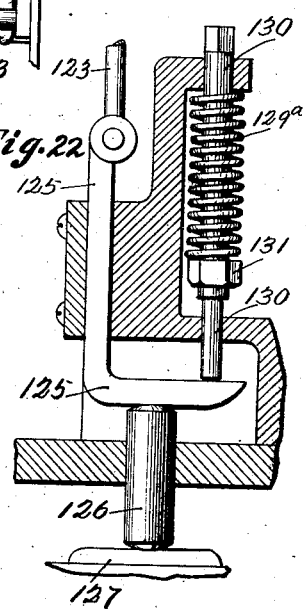

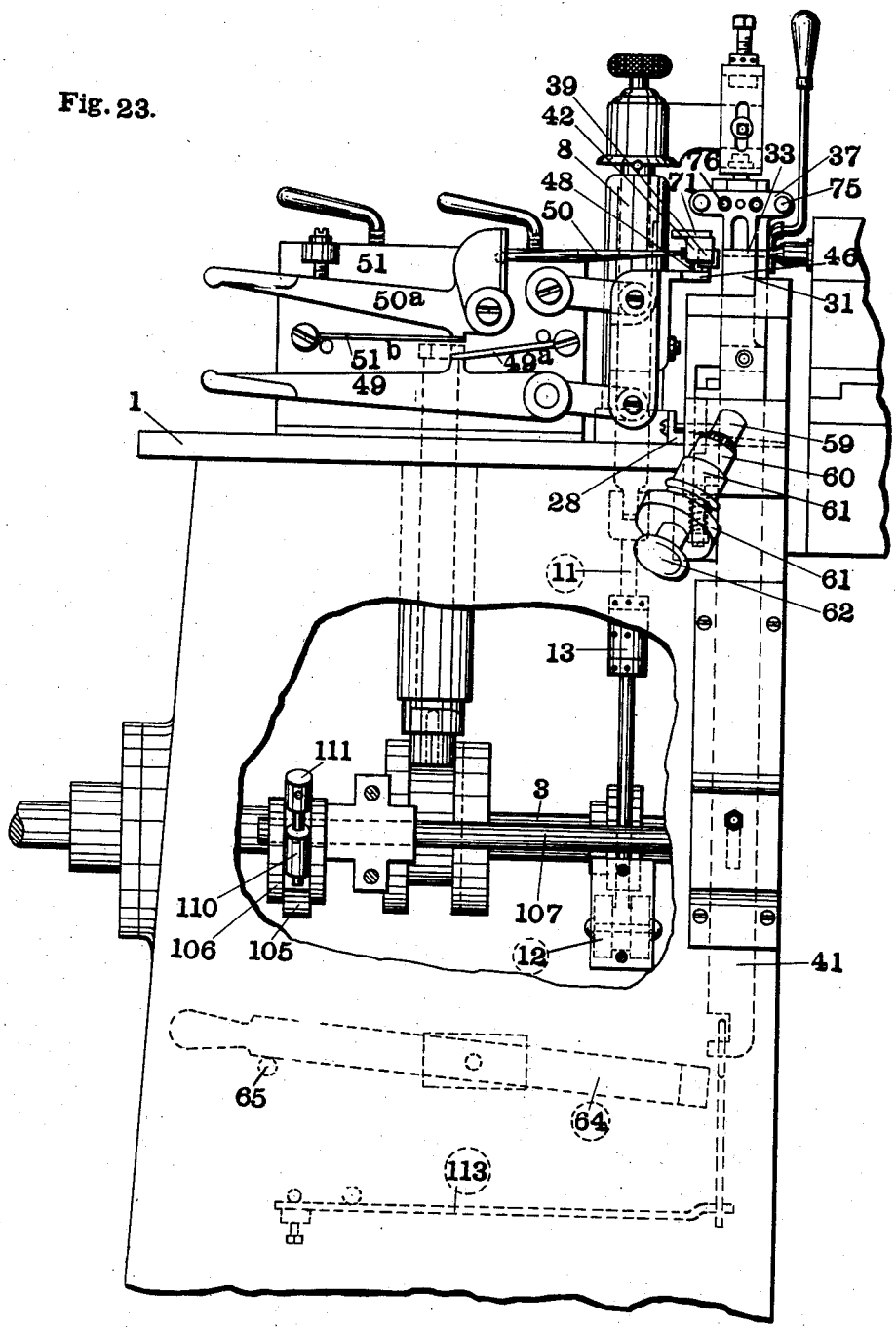

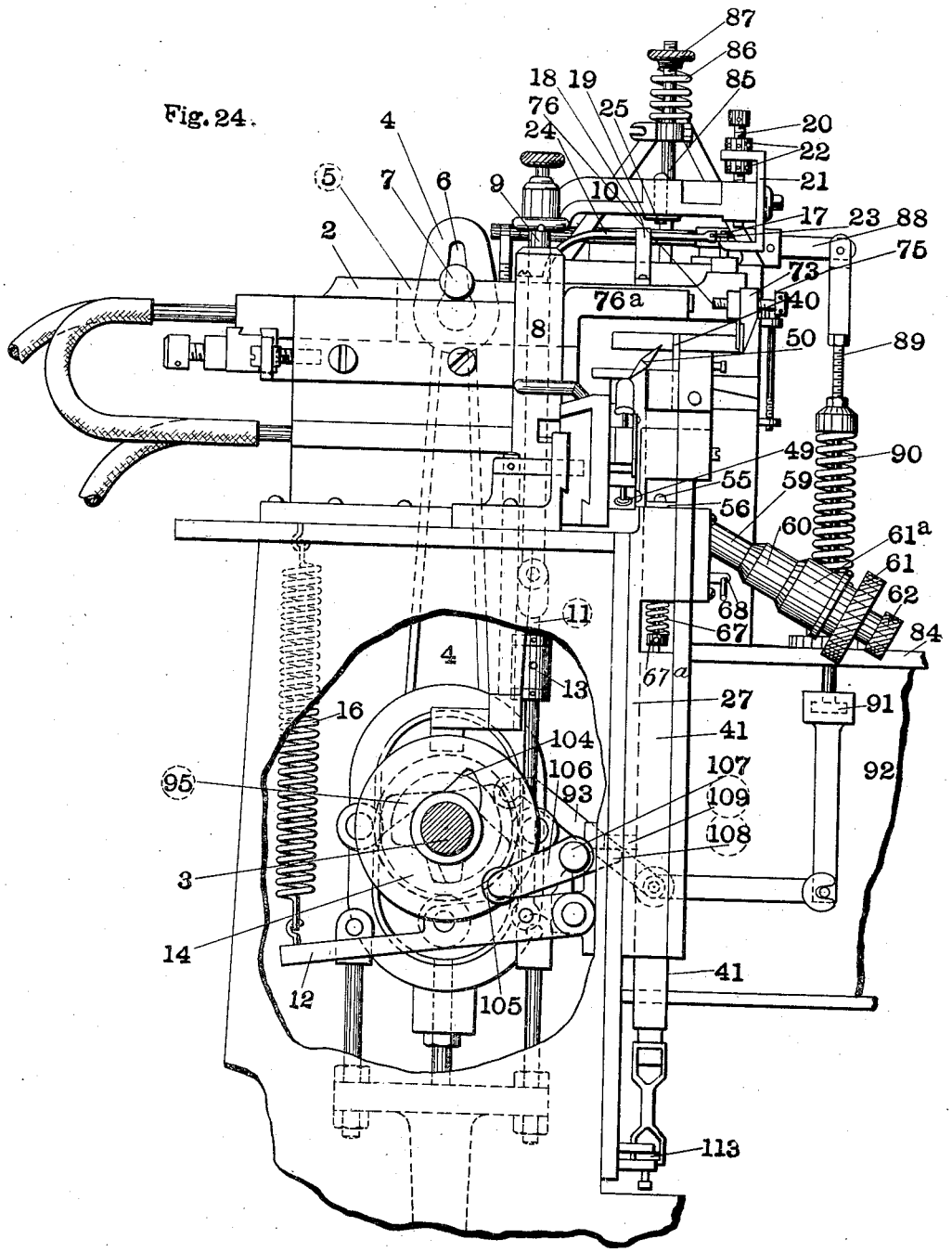

UNITED STATES PATENT OFFICE.

WILLIAM A. SCHRAUBSTADTER, OF ST. LOUIS, MISSOURI, ASSIGNOR TO INLAND TYPE FOUNDRY, OF ST. LOUIS, MISSOURI, A CORPORATION OF MISSOURI.

TYPE-CASTING MACHINE.

No. 828,059.  Specification of Letters Patent.  Patented Aug. 7, 1906.

Application filed April 24, 1903. Serial No. 154,130.

*To all whom it may concern:*

Be it known that I, WILLIAM A. SCHRAUBSTADTER, a citizen of the United States, and a resident of the city of St. Louis and State of Missouri, have invented certain new and useful Improvements in Type-Casting Machines, of which the following is a specification.

My invention relates to type-casting machines, and has for its principal objects to improve the construction, adjustment, and operation of divers parts of the machine and of the machine as a whole.

The invention consists in the parts and in the arrangements and in the combinations of parts hereinafter claimed.

Figure 1:
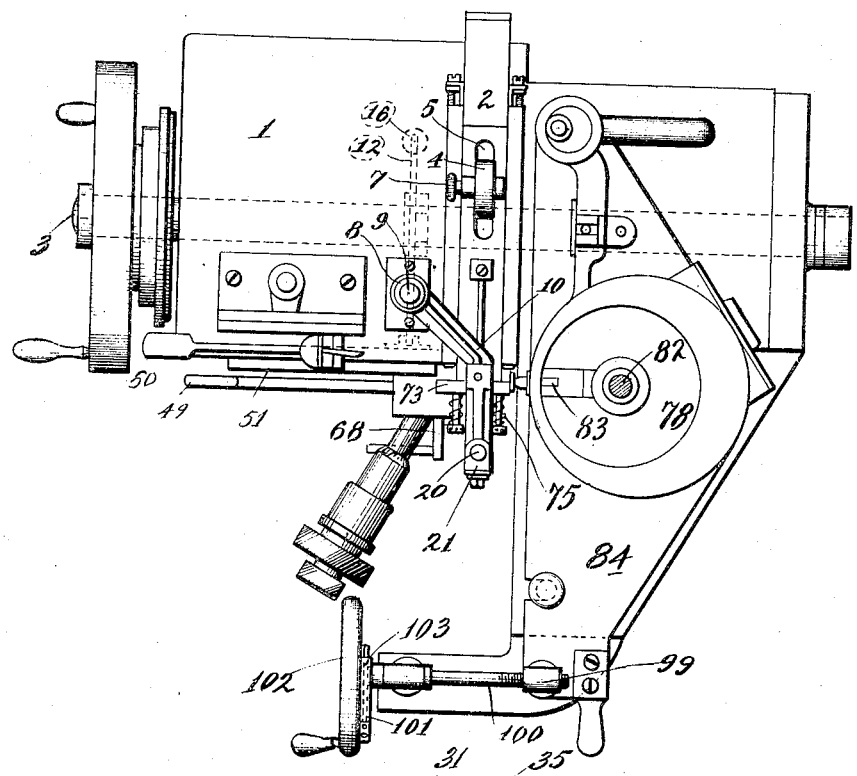
Figure 2:
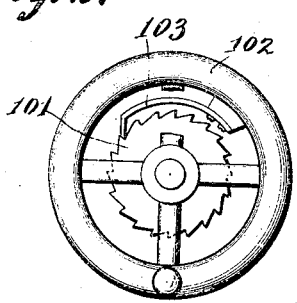
Figure 3:
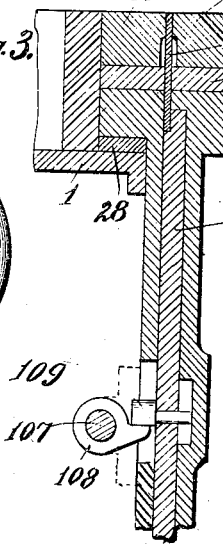
Figure 4:
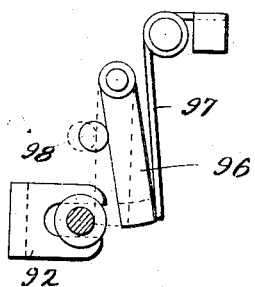
Figure 10:
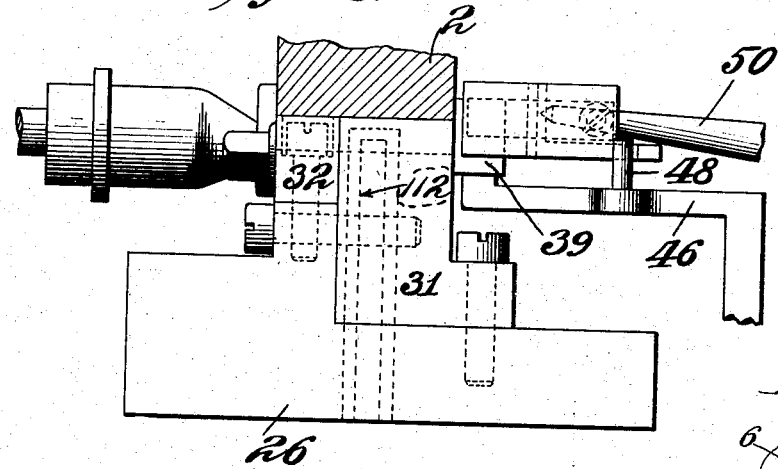
Figure 27:
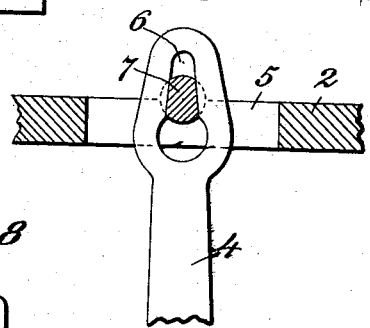
Figure 26:
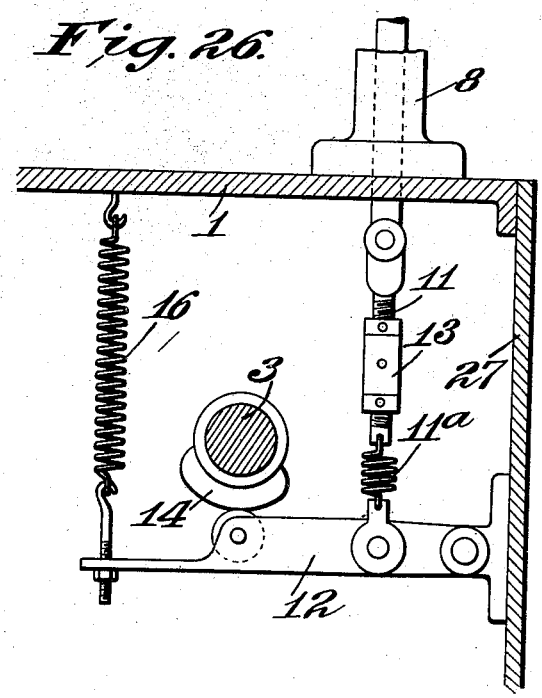
Figure 28:
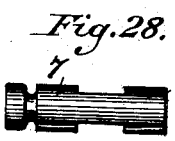
Figure 25:
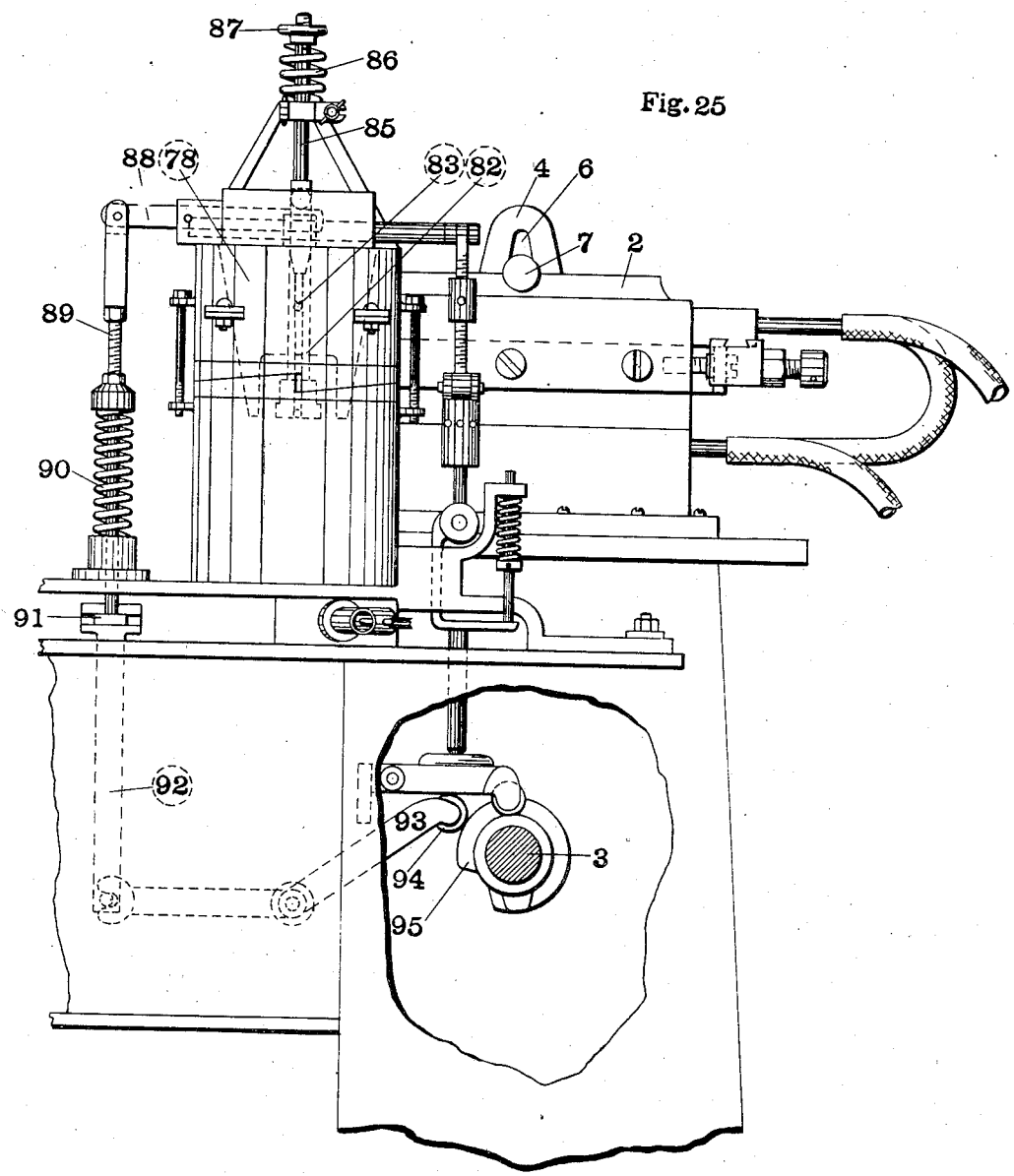

In the accompanying drawings, which form part of this specification, and wherein like symbols refer to like parts wherever they occur, Figure 1 is a plan view of the machine embodying my improvements. Fig. 2 is a detail elevation of a device for preventing the nipple of the melting-pot from jamming against the side of the mold. Fig. 3 is a vertical sectional detail through the body-piece bar and parts adjacent thereto. Fig. 4 is a detail plan of the device for automatically locking the pump. Fig. 5 is a vertical view, partly sectional, of my machine. Fig. 6 is a detail elevation of the adjustable stop for limiting the upward movement of the body-piece bar. Fig. 7 is a detail plan of the means for adjusting the body-piece bar and of the cam for actuating it. Fig. 8 is a vertical sectional detail of the means for adjusting the body-piece bar. Fig. 9 is a detail elevation of said means, taken at right angles to the view of Fig. 8. Figs. 10, 11, and 12 are detail views of the mold at right angles to each other. Fig. 13 is a detail elevation of the means for actuating the body-piece bar. Fig. 14 is a perspective view showing the means for transmitting motion from the rocker-shaft to the body-piece bar. Fig. 15 is a plan detail of the means for actuating the body-piece bar. Fig. 16 is a plan detail view of the matrix-carrier arm carrying the matrix-box with the matrix therein, and Fig. 17 is an end view thereof. Fig. 18 is a vertical detail view of the pump mechanism. Fig. 19 is a vertical sectional detail on the planes indicated by the broken line 19 19 of Fig. 18. Figs. 20 and 21 are detail views showing the pump-valve or choker in opposite positions. Fig. 22 is a detail view showing a removable pin constituting a part of the means for transmitting motion from the actuating mechanism to the pump-valve or choker. Fig. 23 is an elevation of one end of the machine with a portion of the casing broken away to show the actuating mechanism. Fig. 24 is an elevation of one side of the machine with a portion of the casing broken away to show the actuating mechanism, and Fig. 25 is a side elevation of the machine on the side opposite the side shown in Fig. 24, a portion of the casing in this view also being broken away to show the actuating mechanism. Fig. 26 is a detail view showing a modification of the adjustable link 11, said modification consisting in equipping the link with a spring arranged to yield to excess pressure. Fig. 27 is a detail view of the upper end portion of the mold-cover-actuating arm, showing the mold-cover pin in section; and Fig. 28 is a detail view of the mold-cover pin.

My machine comprises a main frame 1, a mold therein, a reciprocating mold-cover 2, and actuating mechanism. The actuating mechanism comprises a cam-shaft 3, arranged to actuate a lever or arm 4, which is pivotally connected to the mold-cover. For this purpose the mold-cover has a vertical opening 5 therethrough, through which said actuating-arm projects. The projecting portion of said arm has a transverse opening 6, which opening is of circular form at its lower portion and has a tapering offset portion of less diameter extending upwardly. The mold-cover pin 7 is a cylindrical bar of proper size to pass through the circular portion of the opening in the actuating-arm, and its middle portion is flattened so as to allow it to extend up into the reduced portion of said opening. Said mold-cover pin is thus locked in its place and its cylindrical ends project so as to overlap the upper surface of the mold-cover and coöperate with grooves or bearing-surfaces provided therefor on said mold-cover. By this central arrangement of the actuating-arm its pressure is applied equally to the two sides of the mold-cover.

In the operation of casting it is necessary to apply considerable pressure to the mold-cover, and it is desirable to relieve this pressure except during the operation of casting. For this purpose the machine is provided with a vertically-arranged hub 8, in which slides a rod 9, whose upper end carries a gripping or clamping arm 10, arranged to project above the mold-cover. This gripping-arm is journaled on the rod 9, so that it can swing horizontally to facilitate the assembling, repair, and adjustment of the parts; but during the operaton of the machine said gripping-arm is fastened in proper position by a cotter-pin or other suitable fastening device. The lower end of said rod 9 is connected by an adjustable link 11 to a lever 12. Preferably said link 11 is made of sections connected by a turn-buckle 13, so as to be extensible. The lever 12 is pivotally mounted on the frame of the machine and bears upwardly against the periphery of a cam 14, mounted on a shaft 3 of the actuating mechanism. Fixed to the framework so as to pull upwardly on the free end of the lever is a spring 16 of sufficient strength to lift the rod 9 and the arm 10, carried thereby, clear of the mold-cover. By this arrangement the rod and the arm thereon are forced downwardly by the cam 14 on the driving mechanism and are raised automatically by means of said spring 16, and the cam is so mounted with relation to the actuating mechanism as to apply its pressure to said arm when the mold-cover is stationary and the type is being cast.

The means whereby the actuating mechanism is made to exert its pressure upon the mold-cover comprises a spring arranged to yield to excess pressure. Preferably this spring 11ª is inserted in the adjustable link 11 as an element thereof, as shown in Fig. 26.

The hub 8 of the device for gripping or clamping the mold-cover is at one side of said mold-cover, and in order to utilize the gripping-arm 10 for operating the type-ejecting plunger 17 said arm is made of angular form, so that its outer portion will be in alinement with the mold-cover. The mold-cover is provided with an anvil 18 on its upper face, and the gripping or clamping arm has a bearing-plate 19, arranged directly above the point occupied by said anvil during the operation of casting. The outer end of said arm is provided with an adjustable screw 20, arranged directly above the point occupied by the ejecting-plunger 17 during the ejecting operation and constitutes the piece for actuating or transmitting motion to said plunger. This screw is adjustable vertically on said arm, and it carries a ⊏-shaped piece or hook 21, whose upper portion is clamped between adjusting-nuts 22 on said screw and whose lower end is bifurcated to admit the type-ejecting plunger between them. This type-ejecting plunger 17 is mounted to slide vertically in the mold-cover and is provided with a shoulder 23, beneath which the forks of the ⊏-shaped hook straddle said plunger, whereby said hook will pull up said plunger in case it should get stuck. In the ordinary operation of the plunger, however, it is raised into its normal position by means of a flat spring 24, mounted upon the mold-cover and engaging the collar on said plunger. The upward movement of said spring is limited by an adjusting-screw 25 provided for the purpose.

The mold is made removable bodily from the machine. The main part 26 of the mold comprises a block which constitutes the base and upon which all of the other stationary parts are secured. This base-block 26 is secured by screws extending therethrough to a platform 27, mounted on the main frame of the machine. This platform has a long downwardly-extending portion which includes the guide for the body-piece bar and upon which the various devices for adjusting the body-piece are mounted. This platform 27 has its under side inclined and rests upon a wedge-block 28, arranged to be moved endwise thereof by means of an adjusting-screw extending through an upturned flange on the projecting end of said wedge and working in a hole in the side of the mold-platform. (See Fig. 23.) The vertical elevation of said platform and consequently the elevation of the mold thereon are thus adjustable to aline accurately with the bearing for the mold-cover.

The middle portion of the base of the mold-cover is raised to constitute the back cheek 31 of the mold and form the notched side of the type. Alongside of this back cheek and projecting forwardly thereof is the jet-plate 32, through which the jet-orifice 33 extends, said jet-plate being secured to the base-plate by means of screws 34. The front cheek 35 of the mold consists of a block resting on the base and adjustable with reference to the back cheek. For this purpose the base-block 26 has a plate 36 fixed at its end and projecting upwardly in front of said front cheek. Through this projecting plate extends one or more headed screws 37, which coöperate with threaded holes in said front cheek, whereby said front cheek can be forced toward said plate. Also extending through said plate is one or more screws 38, which bear at their ends against the surface of the front cheek, whereby said front cheek may be forced away from said plate. By this means the front cheek can be set to any desired adjustment, so as to vary the body thickness of the mold.

The matrix 39 is at the end of the mold opposite the jet-orifice, as usual. Extending up through the base of the mold between the front and back cheeks is a vertically-reciprocating plunger 40, which is arranged to constitute the bottom of the mold and to eject the type from the mold. This bottom piece is hereinafter designated as the "body-piece," and the bar 41, upon which it is mounted, is hereinafter designated as the "body-piece bar." The several parts hereinbefore described constitute the mold proper. The reciprocating mold-cover constitutes, in effect, the top or the upper side of the mold; but as said mold-cover constitutes a permanent part of the machine it is not commonly considered as a part of the mold.

The matrix 39 is mounted in a matrix-box 42. This matrix-box is a piece of metal having a slot or elongated socket formed in its face of proper cross-section for the matrix-box to fit. This socket or matrix-chamber has one end closed for the matrix to abut against it endwise. At the other end of the slot the matrix-box is equipped with a locking-lever 43, adapted to have one end bear against the end of the matrix, and thereby clamp it in position. To produce the proper pressure upon such lever, a screw 44 is mounted on the matrix-box in position to bear against the tail of said lever, and in order to prevent excess pressure the tail of said lever is made resilient, as by slotting it lengthwise, as shown at 45 in Fig. 16.

The matrix or matrix-box is mounted upon a matrix-carrier arm 46, so as to be free to adjust itself properly to the angle in which it rests. For this purpose the matrix or the matrix-box has holes 47 formed therein of a size sufficient to loosely receive supporting-pins 48, provided therefor on the carrier-arm. The carrier-arm is mounted on a lever 49, provided with a spring 49$^a$, arranged to cause said lever to exert an upward pressure on said supporting-pins, and a thrust-bar 50 is mounted to turn universally upon a hand-lever 50$^a$, against which bears a spring 50$^b$, so arranged as to push said thrust-bar inwardly against the matrix or its box. Both the carrier-arm and the thrust-bar are mounted on a sliding frame 51, arranged to be pressed forward by the actuating mechanism during each operation of casting and to be withdrawn after such operation. By thus having the holes 47 in the matrix or matrix-box larger than the supporting-pins and having resilient pressure on said matrix or box the proper positioning thereof is secured before the sliding frame is pushed forward.

Opposite the front end of the matrix-box an upward extension of the base-plate of the mold is provided with a plate 52, which constitutes the lining-base. This lining-base 52 is arranged for the matrix or the matrix-box to abut against and is mounted on parallel pins 53, which extend through holes provided therefor in a piece fixed to the base-plate or front cheek, so as to constitute guides to secure the proper movement of said lining-gage. The movement of said lining-base is effected by means of an adjusting-screw 54, mounted in said fixed piece to bear against said lining-base. Instead of this device, thin distance-plates may be inserted vertically between said fixed piece and said lining-base, in which case a screw is used to draw said lining-base toward the fixed piece.

The width of the mold is varied by means of a micrometer arranged and operating as follows: The body-piece bar 41 is a vertically-movable plate which is provided with the body-piece 40 of the mold and is arranged between the front and back cheeks of the mold, as hereinbefore stated. Near its upper end this body-piece bar is equipped with a pin 55, extending laterally from the front side thereof. The under surface of this pin is squared off horizontally and rests upon a wearing or impact plate 56, which in turn rests against the upper horizontal face of the wedge end 57 of the micrometer bar or slide 58. This micrometer bar or slide 58 is prevented from turning, but is free to slide in a guide 59, which is arranged at a slight upward and inward inclination on a depending portion of the vertically-adjustable mold-platform 27. Any suitable form of micrometer-gage may be used—for instance, that shown in Fig. 8. As shown in this figure, the projecting part of guide 59 of the micrometer-bar is made of cylindrical form. The exterior of this guide is screw-threaded and has a threaded sleeve 60 working thereon. One end of this sleeve has an internal flange 61 overhanging the end of said guide, and the other end of this sleeve is beveled off and marked with a scale. Said sleeve is slit lengthwise to make it resilient, and the exterior of said sleeve 60 is threaded and has a slightly-tapering threaded nut 61$^a$, working thereon to make the sleeve work properly on the thread of the guide. The end of the micrometer-bar or wedge-slide projects through the end of the micrometer-sleeve and is threaded and provided with a hand-nut 62 thereon. This nut 62 and the micrometer-bar 58 may be manipulated rapidly without affecting the adjustment of the gage, the operation being as follows: When the nut 62 is unscrewed, the micrometer-bar may be pushed inwardly. When the nut is being screwed onto the micrometer-bar, it does not affect the position of the micrometer-bar until the nut bears against the flange 61 on the sleeve 60 but from the time when the nut 62 bears against the flange 61 its further screwing on draws the micrometer-bar upwardly until the shoulder 63 on said bar bears against the flange 61 on the sleeve 60 and is stopped thereby. Between the end of the guide and the flange of the sleeve overlapping it the micrometer bar or nut has a collar or shoulder 63.

By manipulation, as above described, the micrometer bar or slide is moved endwise between the limiting positions fixed by the end of its guide and the flange of the micrometer-sleeve, respectively. As the endwise movement of the wedge end of the micrometer bar or slide changes its elevation the lowermost position of the body-piece bar is limited thereby (by reason of its pin bearing against the impact-plate which in turn rests upon the micrometer-wedge) and the position of the body-piece thereby adjusted to secure the desired width or set of the type.

It is desirable to be able to lift the body-piece bar while the machine is not in operation. For this purpose the machine is provided with a hand-lever 64, one end of which rests under the end of the body-piece bar, while its other end normally rests upon a bolt 65, provided therefor in the frame. In order to raise the body-piece bar, the hand-lever is pulled laterally off its rest and then pressed downwardly, whereby the opposite end of said hand-lever forces the body-piece bar upwardly against the force of a spring which normally holds said body-piece bar in its lowermost position.

For convenience of adjustment the front of the machine opposite the wedge end of the micrometer-bar and the impact-block is open to give free access to said impact-block. This impact-block is ⊏-shaped. (See Fig. 9.) Its top flange rests upon the wedge of the micrometer-bar and its lower flange is pushed downward by a spring 67, fixed to the frame or the depending portion of the mold-platform 27 to always keep the same in contact with the micrometer-bar. Preferably the spring 67 is a helical spring, which surrounds a downwardly-depending stem 56$^a$ of the impact-block 56. The end portion of this spring is screw-threaded and provided with a nut 67$^a$, which constitutes the lower abutment of the spring 67. As the upper end of the spring 67 bears against the fixed part the spring 67 normally holds the impact-block 56 against the wedge end 57 of the micrometer-bar. After the body-piece bar has been raised to its uppermost adjusted position the micrometer-bar and the impact-block thereon are lowered, and a die or distance-piece of the thickness desired for the set or thickness of the type to be formed is mounted upon the impact-block and between it and the pin of the body-piece bar. Then the micrometer is manipulated until said impact-block in its upward movement is forced against the overhanging pin of the body-piece bar, in which position the parts are accurately set for the desired set or thickness of the type. After the adjustment is thus effected the die or distance-piece is removed. The impact-block is locked in position by means of a hand-screw 68, provided for the purpose. This hand-screw 68 works in a threaded hole provided therefor in a piece projecting from the guide of the body-piece bar 41. By turning the hand-screw 68 it jams or clamps the impact-block bodily against the stationary portion of the machine.

The vertical stroke of the body-piece bar is regulated so as to bring the top end of said body-plate in its uppermost position flush with the top of the mold. For this purpose an eccentric 69 is mounted (see Fig. 6) on the frame of the machine above a bolt or pin 70, arranged horizontally on the body-piece bar. This arrangement furnishes an accurate means for limiting the upward movement of the body-piece.

The proper position of the printing-face on the end of the type is determined by means of a horizontal plate or stool 71, fixed upon the base-block of the mold and vertically adjustable thereon by means of the usual intervening distance-plates. This plate or stool 71 is secured to the base-block by means of set-screws 72, as illustrated in Fig. 12.

On the end of the mold-cover is a gripping-jaw which consists of a plate or block 73, mounted to slide on two or more bolts or bars 74, which are screwed into the end of said mold-cover. Each of said bolts has a coiled spring 75 surrounding it, which springs bear at one end against the heads of the respective bolts and at the other against the gripping-jaw 73 to force it toward the end of the mold-cover. The tension of said springs is regulated by turning the screw-bolts. The gripping-jaw is equipped with one or more set-screws or bolts 76, arranged to coöperate with limiting-stops or abutment-pieces 76$^a$, provided therefor on a fixed portion of the machine. These abutment-pieces are so located that they permit the gripping-jaw to travel rearwardly with the mold-cover to a point close to the edge of the mold, at which point the movement of the jaw is stopped, while the rearward movement of the mold-cover continues. In consequence of this arrangement the gripping-jaw opens above the mold—that is, the end of the mold-cover is separated from the gripping-jaw by a space directly above the mold and wide enough to admit the type from the mold. The mold itself is of a common type, and the body-piece ejects the type upwardly into the gripping-jaw in a manner well known in the art. The operation of casting is effected while the cover is in its foremost position, at which time said cover is clamped firmly down on the mold and just after the ejecting-plunger has ejected a type from the gripping-jaw.

As shown in Fig. 12, the lower portion of the inner face of the clamping-jaw 73 is offset, and said jaw is provided with a flat spring or resilient plate 77, countersunk flush with the face of the gripping-jaw and extending over said offset portion. In operation the spring portion of the jaw bears against the type and supports it by friction preparatory to the ejecting-plunger forcing the type into the perfecting mechanism or other receiving device therefor.

At one end of the mold is the jet-orifice, which communicates with the melting-pot 78, as usual. This jet-orifice is an opening between the front and back jet-plates, and in the operation of casting type there is a "jet" formed on the end of said type. Heretofore said jet has been removed by means of a jet-breaker upon the top of the mold. It is desirable, however, for divers reasons, to occasionally obtain type with the jet thereon. For this reason the jet-breaker 79 in the present machine is mounted upon the type-dressing portion A of the machine instead of upon the casting portion, said dressing portion being arranged to slide relative to the casting portion. This jet-breaker 79 consists merely of a knife or sharp-edged plate mounted upon the frame of the type-dresser in such a position that when the type-dressing portion is brought into operative position with relation to the type-casting portion the type in the casting portion will be forced against it and have the jet removed therefrom. In case the type-making machine has no perfecting mechanism separable therefrom the jet-breaker may be mounted on a slide provided especially therefor in an extension of the main frame.

The machine is provided with an ordinary melting-pot 78, together with an ordinary pumping mechanism, including the common pump-plunger 82 and pump-valves 117 and 119. This melting-pot is mounted upon a bracket 84, which is pivotally mounted on the frame of the machine. As the pump mechanism is ordinarily mounted with the melting-pot its connection to the driving mechanism is separable.

The jet-nozzle comprises a chamber 114, having an orifice 115, said chamber being connected to the pump-cylinder by a passage-way 116. Within chamber 114 is a pin or plug-valve 117, arranged to close and open the jet-orifice 115. This plug-valve is mounted on a bar 118, which also carries a valve 119 to close and open the inlet to the chamber 114. There is an extension of bar 118, which is connected to a crank-arm 120, whereby said bar and its valves may be reciprocated. The crank-arm is mounted on a rock-shaft 121, to which is affixed a second crank-arm 122. This second crank-arm is connected by a link 123, containing a turnbuckle 124 for varying its length, to a bar 125, arranged to slide vertically in the frame or bracket. The lower end of this bar is bent horizontally to form a bearing-face for the end of a pin 126, which fits loosely in the bracket-frame. The lower end of the pin rests upon the top side of a lever 127, fulcrumed in the main frame and carrying a roller 128, arranged to bear against a cam 129. In order to keep the roller 128 in contact with its cam, a spring 129ª is arranged to exert a downward pressure thereon. This spring surrounds a rod 130, which is vertically movable in the bracket-frame and bears at its upper end against said frame and at its lower end against an adjustable shoulder 131 on said rod 130. The lower end of the rod bears against the lateral offset of bar 125, whereby the pressure of the spring is transmitted through said rod and bar to the movable pin 126, and thence directly to the cam-lever 127.

In the construction shown in the drawings the pump-plunger has an upward extension 85, which extends upwardly through guides provided therefor on the melting-pot. A coiled spring 86 surrounds the upper end of said plunger-stem and bears at one end against the guide-support and at the other end against a nut 87, screwed on the top end of said plunger, whereby said spring tends to hold said plunger in its uppermost position. Pivotally mounted on the melting-pot is a horizontal lever 88, one end of which engages the stem of the plunger and the other end of which is connected to a vertical rod 89. Around this vertical rod is coiled a spring 90, whose upper end bears against a shoulder on said rod and whose lower end bears against a stationary part of the bracket, whereby the spring tends to keep said rod normally in its uppermost position. The lower end of said rod extends down through the bracket and has an enlarged head or collar 91.

Mounted on the main frame of the machine is a vertically-movable bar 92, whose upper end extends laterally toward the pump mechanism and is bifurcated in position to straddle the vertical rod above the enlarged head or collar, so as to interlock therewith. This last-mentioned bar is pivotally connected to one end of a lever 93, which is fulcrumed in the main frame and which carries at its other end a roller 94 in position to bear against a cam 95, mounted on the main cam-shaft of the machine or upon a shaft specially provided for the purpose. By this arrangement the coiled spring causes said roller to bear against the cam, whereby the cam is enabled to reciprocate the plunger of the pump.

It is desirable to lock the plunger against accidental movement when the melting-pot is out of its working position. For this purpose a pawl 96 is pivotally mounted on the pivoted supporting-bracket 84 of the melting-pot to swing horizontally with relation to said supporting-bracket. (See Figs. 4, 18, and 19.) The pawl is normally pressed against the vertical rod 89 above the enlarged head 91 thereof by means of a spring 97, provided for the purpose. Mounted upon the main frame is a fixed pin 98, arranged in such position that the pawl bears against it when the bifurcated end of the link engages the enlargements of the vertical rod. By this arrangement the swinging of the melting-pot bracket causes the pawl to bear against the stationary pin, whereby the pawl is disengaged from the vertical rod simultaneously with the engagement of said vertical rod by the bifurcated link. When the melting-pot bracket is swung away from the casting mechanism, the pawl engages and locks the vertical rod simultaneously with the disengagement of the bifurcated link therefrom.

For the purpose of adjusting the jet-nozzle laterally or transversely to the line of motion of said mold-cover the outer or free end of the bracket is provided with an internally-threaded screw 99, arranged to aline with a threaded shaft 100, mounted on the main frame of the machine and having shoulders arranged to abut against its bearings, so as to prevent longitudinal movement of said shaft. Upon this shaft is fixed a ratchet-wheel 101. On the outer end of the shaft, near the ratchet-wheel, is loosely mounted a hand-wheel 102, which carries a stiffly-resilient spring 103. This arrangement constitutes, in effect, a friction-clutch. In operation the turning of the hand-wheel will carry with it the ratchet and the shaft so long as the force required to move the bracket is less than the force required to lift the springs out of engagement with its ratchet. When the force required to further swing the bracket exceeds the force required to lift the stiff pawl, the hand-wheel turns idly, whereby it is impossible to distort the mold or to injure the jet-nozzle or nipple by jamming it too tight against the side bars of the mold.

The body-piece bar is actuated from the cam-shaft 3 by means of a cam 104 thereon. This cam is arranged to bear against a friction-wheel 105, mounted on the end of an arm 106, loosely mounted on a rock-shaft 107. This rock-shaft is mounted in bearings provided therefor on the depending portion of the mold-platform 27 and has fixed thereto a toe or a wiper 108, which is arranged to bear against the under side of a pin 109, fixed to the body-piece bar. Also fixed to said shaft is a block 110, through which projects a set-screw 111 in position to bear against a rib on the loose arm. For convenience of construction the arm is preferably bifurcated, and the block and its set-screw are mounted between the forks thereof. By manipulating the set-screw 111 the position of the friction-wheel on the end of said arm is varied with relation to the actuating-cam 104, and consequently the stroke of the body-piece bar is varied accordingly.

In operation the cam 104 strikes and trips the rocker-arm, and thereby raises and releases the body-piece bar, which is returned to its lower position by means of a spring 113; but by reason of the arm 106 being loose upon its shaft the shock and jar on the body-piece caused by such return is considerably relieved.

As shown at 112 in Figs. 10 and 11, the cheeks of the mold have connecting passageways extending therethrough to provide for the flowing of water to cool the mold.

Obviously the constructions hereinbefore described admit of considerable modification without departing from my invention, and I do not wish to be restricted to said constructions.

What I claim is—

1. In a type-casting machine, a frame, a separable mold mounted thereon comprising a reciprocating mold-cover, and actuating mechanism, said mold-cover having a slot extending vertically therethrough, an arm arranged to be actuated by said actuating mechanism and having its end extend through the slot in the mold-cover and having a hole with a reduced upward extension through its projecting end and a removable pin extending through said hole, the intermediate portion of said pin being reduced to fit the reduced portion of said hole and the ends of said pin resting in bearings provided therefor in the upper side of the mold-cover.

2. A type-casting machine comprising a mold, a reciprocating mold-cover arranged to be stationary during the period of casting, means for forcing molten metal into said mold, and means arranged to exert pressure upon said mold-cover simultaneously with the forcing of metal into the mold and then relieve said pressure while the mold-cover is stationary.

3. A type-casting machine comprising a mold, a reciprocating mold-cover arranged to be stationary during the period of casting, means for forcing molten metal in the mold, an arm arranged above said mold-cover and actuating mechanism arranged to bear said arm against the mold-cover simultaneously with the forcing of the metal into said mold and then raise said arm above said mold-cover while the mold-cover is stationary.

4. A type-casting machine comprising a mold, a reciprocating mold-cover, means for forcing molten metal into the mold, an arm arranged above said mold-cover, actuating mechanism, transmitting mechanism connected thereto and arranged to bear said arm against the mold-cover simultaneously with the forcing of metal into said mold and then raise said arm above said mold-cover while the mold-cover is stationary, said transmitting mechanism being adjustable.

5. A type-casting machine comprising a mold, a reciprocating mold-cover, means for forcing molten metal into the mold, an arm arranged above said mold-cover, actuating mechanism comprising a cam, a lever mounted to coöperate with said cam and a bar connected to said lever and arranged to carry said arm, all arranged to force said arm against the mold-cover simultaneously with the forcing of metal into said mold and then raise said arm above said mold-cover while the mold-cover is stationary.

6. A type-casting machine comprising a mold, a reciprocating mold-cover, means for forcing molten metal into the mold, an arm arranged above said mold-cover, actuating mechanism comprising a cam, a lever mounted to coöperate with said cam, an extensible bar connected to said lever and arranged to carry said arm, all arranged to force said arm against the mold-cover simultaneously with the forcing of metal into said mold and then raise said arm above said mold-cover while the mold-cover is stationary.

7. A type-casting machine comprising a mold, a reciprocating mold-cover; means for forcing molten metal into the mold, an arm arranged to swing horizontally above said mold-cover, and actuating mechanism arranged to bear said arm against the mold-cover simultaneously with the forcing of metal into said mold and then raise said arm above said mold-cover.

8. A type-casting machine comprising a mold, a reciprocating mold-cover arranged to be stationary during the period of casting, means for forcing molten metal into the mold, an arm arranged above said mold-cover, and actuating mechanism arranged to bear said arm against the mold-cover simultaneously with the forcing of metal into said mold and then raise said arm above said mold-cover, said arm having a piece arranged to actuate the plunger of the type-carrier.

9. A type-casting machine comprising a mold, a reciprocating mold-cover, means for forcing molten metal into the mold, an arm arranged above said mold-cover, and actuating mechanism arranged to bear said arm against the mold-cover simultaneously with the forcing of metal into said mold, and then raise said arm above said mold-cover, said arm having a piece adjustably mounted thereon in position to actuate the plunger of the type-ejector.

10. A type-casting machine comprising a mold, a reciprocating mold-cover, means for forcing molten metal into the mold, a type-ejecting plunger, an arm arranged above said mold-cover and actuating mechanism arranged to bear said arm against the plunger and against the mold-cover simultaneously with the forcing of metal into said mold and then raise said arm above said mold-cover.

11. A type-casting machine comprising a mold, a reciprocating mold-cover, means for forcing molten metal into the mold, a type-ejecting plunger, an arm arranged above said mold-cover and actuating mechanism arranged to bear said arm against the plunger and against the mold-cover simultaneously with the forcing of metal into said mold-cover and then raise said arm above said mold-cover.

12. A type-casting machine comprising a mold, a reciprocating mold-cover arranged to be stationary during the period of casting, means for forcing molten metal into said mold, and means arranged to exert pressure upon said mold-cover simultaneously with the forcing of metal into the mold and to relieve the pressure while the mold-cover is still stationary, a type-ejecting plunger, a spring for retracting said plunger, and means arranged to actuate said plunger simultaneously with the forcing of metal into the mold.

13. A type-casting machine comprising a mold, a reciprocating mold-cover, means for forcing molten metal into said mold, means to exert pressure upon said mold simultaneously with the forcing of the metal into the mold, a type-ejecting plunger, a spring to retract said plunger, means to limit the movement of said spring, means to vary the movement of said plunger both upward and downward, means to connect the pressure-arm to said plunger during both upward and downward movement and means to retain said plunger in a position to engage with pressure-arm.

14. In a type-casting machine, a mold having a movable body-piece having a projection thereon, and means for actuating said body-piece and an adjustable eccentric arranged in the path of said projection to limit the inward movement of the body-piece.

15. In a type-casting machine, a mold having a movable body-piece having a projection thereon, means for actuating said body-piece and independent means for retracting it, and an adjustable eccentric mounted on the frame in the path of said projection in position to limit the inward movement of said body-piece.

16. In a type-making machine, a type-casting mechanism comprising a mold having a reciprocating body-piece, mechanism for actuating body-piece in one direction and independent means for retracting it, an impact-block arranged to limit the downward movement of said body-piece and an independently-adjustable support for said impact-block said impact-block being separate from but resting upon said support.

17. In a type-casting machine, a mold having a movable body-piece, a body-piece bar therefor and a lateral projection on said body-piece bar, and means for limiting the downward movement of said body-piece bar, said means comprising an adjustable wedge-piece and an impact-block separate from but resting against said wedge-shaped piece in position for said projection to rest upon.

18. In a type-casting machine, a mold having a movable body-piece, a body-piece bar therefor, and means for limiting the outward movement of said body-piece bar, said means comprising a wedge-piece and a stem therefor, an exteriorly-threaded cylindrical guide for said stem, and a threaded sleeve on said threaded guide-piece and having a flange overlapping the end thereof, said stem projecting through a hole in the flange of said sleeve and having a collar between the end of said guide and said flange and being threaded at its end, and a nut working on said threaded end.

19. In a type-casting machine, a mold having a movable body-piece, and means for limiting the outermost position of said body-piece, said means comprising a wedge-shaped adjusting-piece, and an impact-block separate from but resting against said wedge-shaped piece in position for a piece on the body-piece bar to rest upon.

20. In a type-casting machine, a mold having a movable body-piece, and means for limiting the outermost position of said body-piece, said means comprising a wedge-shaped adjusting-piece, and an impact-block separate from but resting against said wedge-shaped piece in position for a piece on the body-piece bar to rest upon, and means for securing said impact-block in position.

21. In a type-casting machine, a mold having a movable body-piece, and means for limiting the outermost position of said body-piece, said means comprising a wedge-shaped adjusting-piece, and an impact-block separate from but resting against said wedge-shaped piece in position for a piece on the body-piece bar to rest upon, and the frame of the machine being open to said impact-block, whereby a distance-piece may be inserted between said impact-block and the piece on the body-piece bar for determining the adjustment of the parts.

22. In a type-casting machine, a mold having a movable body-piece, and means for limiting the outermost position of said body-piece, said means comprising a wedge-shaped adjusting-piece, and a [-shaped impact-block separate from but resting against said wedge-shaped piece in position for a piece on the body-piece bar to rest against, and a spring for holding said impact-block against said wedge.

23. In a type-casting machine, a mold having a movable body-piece, and means for limiting the outermost position of said body-piece, said means comprising a wedge-shaped adjusting-piece, and a [-shaped impact-block separate from but resting against said wedge-shaped piece in position for a piece on the body-piece bar to rest against, and a spring for holding said impact-block against said wedge, and means for regulating the force of said spring.

24. In a type-forming machine, a mold having a movable body-piece, an upwardly-inclined bar adjustable lengthwise transversely of the body-piece bar and having the upper face of its end portion horizontal and an impact-block separate from said inclined bar but resting upon said horizontal face, whereby said inclined bar is adapted to coöperate with said body-piece bar to limit the downward movement thereof.

25. In a type-forming machine, a mold having a movable body-piece, an upwardly-inclined bar adjustable lengthwise transversely of the body-piece bar and having the upper face of its end portion horizontal, and an impact-block separate from said inclined bar but resting upon said horizontal face, whereby said inclined bar is adapted to coöperate with a projection on said body-piece bar to limit the downward movement thereof.

26. In a type-casting machine, means for limiting the downward movement of the body-piece of the mold, the said means comprising an exteriorly-threaded hub, a draw-bar mounted to slide in said hub and carrying an adjusting wedge-block at its inner end, and a sleeve threaded to work on said hub, said draw-bar having a collar near its outer end, and its endmost portion being threaded and having a nut thereon, and said sleeve having an internal flange arranged between said collar and said nut.

27. In a type-making machine, a mold having a movable body-piece mounted on a reciprocating bar, said bar having a lateral projection therefrom, and a threaded draw-bar adjustable transversely of said body-piece bar and having a wedge at its end adapted to coöperate with said lateral projection to limit the downward movement thereof, and means for relieving said wedge of bending stresses said means comprising a separate impact-block interposed between said wedge and said lateral projection.

28. In a type-making machine, a type-casting mechanism comprising a separable mold having a reciprocating body-piece and a spring for retracting it, actuating mechanism, and mechanism for transmitting motion from said actuating mechanism to said body-piece, said actuating mechanism comprising a rock-shaft having an arm thereon arranged to engage and disengage the transmitting mechanism, said arm being free to swing in one direction and being adjustable with reference to the position of the body-piece.

29. In a type-making machine, a type-casting mechanism comprising a horizontal driving-shaft, a horizontally-reciprocating mold-cover arranged transversely thereto, a mold, a matrix-carrier movable transversely of said mold-cover, said mold having a vertically-movable body-piece, and an adjustable threaded bar having a wedge-block arranged close to the mold in position to limit the downward movement of said body-piece, said bar being located in the angle between the matrix-carrier and the delivery end of the machine and extending downwardly and outwardly in a position for convenient manipulation.

30. A type-casting machine comprising a mold and a vertically-adjustable support for said mold, said support having mounted thereon the body-piece bar and the means for adjusting said body-piece bar.

31. A type-casting machine comprising a frame, a mold, and a support for said mold adjustably mounted on said frame and a wedge intervening between a fixed portion of said frame and an overhanging portion of said support, said support having mounted therein the body-piece bar and means for adjusting said bar.

32. A type-casting machine comprising a mold, means for forcing molten metal into said mold, actuating mechanism, and connecting devices for transmitting motion from said actuating mechanism to said forcing means, said forcing means being movable with relation to the actuating mechanism and said transmitting devices comprising a reciprocating hook-bar permanently positioned with reference to the actuating mechanism and a coöperating piece permanently positioned with reference to the forcing means.

33. A type-casting machine comprising a mold, means for forcing molten metal into said mold, actuating mechanism, and connecting devices for transmitting motion from said actuating mechanism to said forcing means, said forcing means being mounted to swing with relation to the actuating mechanism and said transmitting devices comprising a reciprocating hook-bar permanently positioned with reference to the actuating mechanism and a coöperating piece permanently positioned with reference to the forcing means.

34. A type-casting machine comprising a main frame, a mold therein, means for forcing molten metal into the mold, a support for said forcing means pivotally mounted upon the main frame, actuating mechanism and transmitting devices arranged to transmit motion from said actuating mechanism to said forcing means and comprising a connecting device adapted to engage and disengage automatically with the swinging of the support, a device mounted upon said support for automatically locking said forcing means.

35. A type-casting machine comprising a main frame, a mold therein, means for forcing molten metal into the mold, a support for said forcing means pivotally mounted upon the main frame, actuating mechanism and transmitting devices arranged to transmit motion from said actuating mechanism to said forcing means and comprising a connecting device adapted to engage and disengage automatically with the swinging of the support, and a device mounted upon said support for locking said forcing means, said locking device being arranged to lock the forcing mechanism simultaneously with the disengagement of said connecting device.

36. A type-casting machine comprising a main frame, a mold therein, means for forcing molten metal into said mold, a support for said forcing means pivotally mounted upon the main frame, actuating mechanism and transmitting devices arranged to transmit motion from said actuating mechanism to said forcing means and comprising a connecting device adapted to engage and disengage automatically with the swinging of the support, and a device mounted upon said support for locking said forcing means, said locking device comprising a spring-actuated pawl mounted upon said support in position to engage a member of said transmitting devices and in position to be moved against a piece on the main frame.

37. A matrix-box for a type-casting machine comprising a piece containing a socket for the matrix, said socket being closed at one end, and said piece having a lever at the other end of said socket arranged to bear against the end of said matrix and a spring arranged to exert pressure upon said lever.

38. A matrix-box comprising a piece containing a socket for the matrix, said socket being closed at one end, and said piece having a clamping-lever at the other end of said socket arranged to bear against the end of the matrix, a screw, and a spring interposed between said lever and said screw.

39. A matrix-box for a type-casting machine comprising a receptacle for the matrix, a clamping-lever arranged to bear against the end of the matrix, and a screw arranged to bear against said lever, the portion of the lever against which said screw bears being slotted longitudinally to make it resilient.

Signed at St. Louis, Missouri, this 20th day of April, 1903.

WM. A. SCHRAUBSTADTER.

Witnesses:
JAMES A. CARR,
JULIA B. MEGOWN.